Oct. 1, 1963  G. D. FLAITH ETAL  3,105,266
COMBINATION LATCH AND HINGE
Filed Jan. 5, 1961  5 Sheets-Sheet 1

INVENTORS:
GEORGE DONALD FLAITH
JOHN A. WESTENBERGER
BY Howson & Howson ATTYS.

Oct. 1, 1963
G. D. FLAITH ETAL
3,105,266
COMBINATION LATCH AND HINGE
Filed Jan. 5, 1961
5 Sheets-Sheet 2
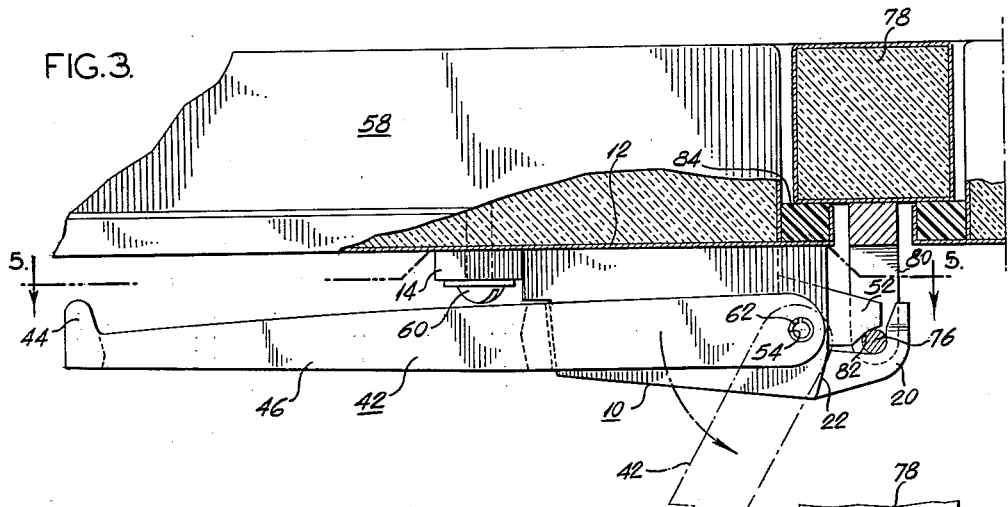
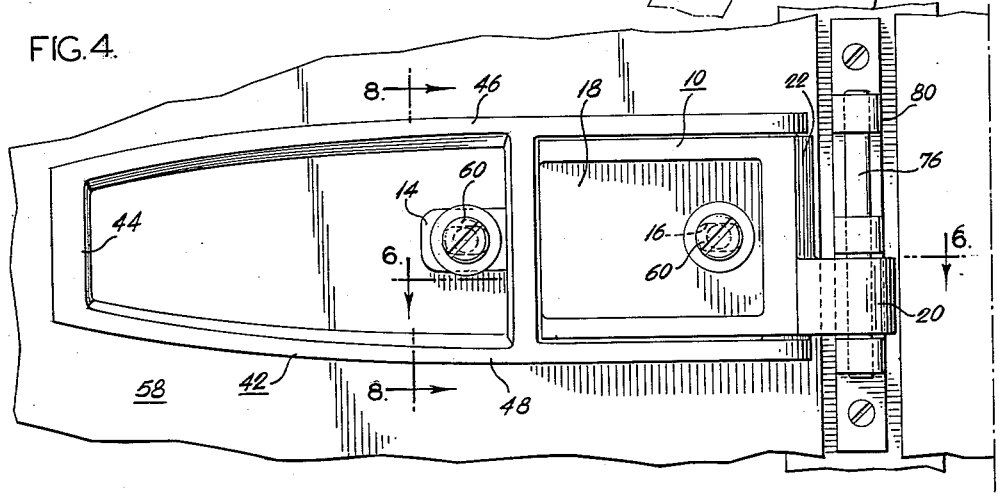
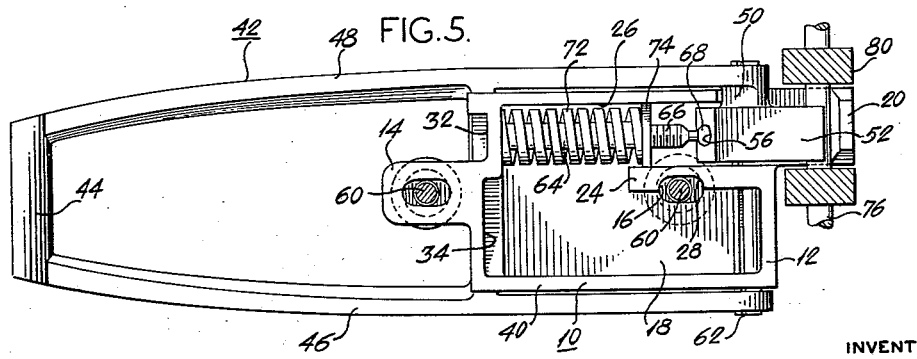
INVENTORS:
GEORGE DONALD FLAITH
JOHN A. WESTENBERGER
BY
Howson & Howson
ATTYS Oct. 1, 1963  G. D. FLAITH ETAL  3,105,266
COMBINATION LATCH AND HINGE
Filed Jan. 5, 1961  5 Sheets-Sheet 3
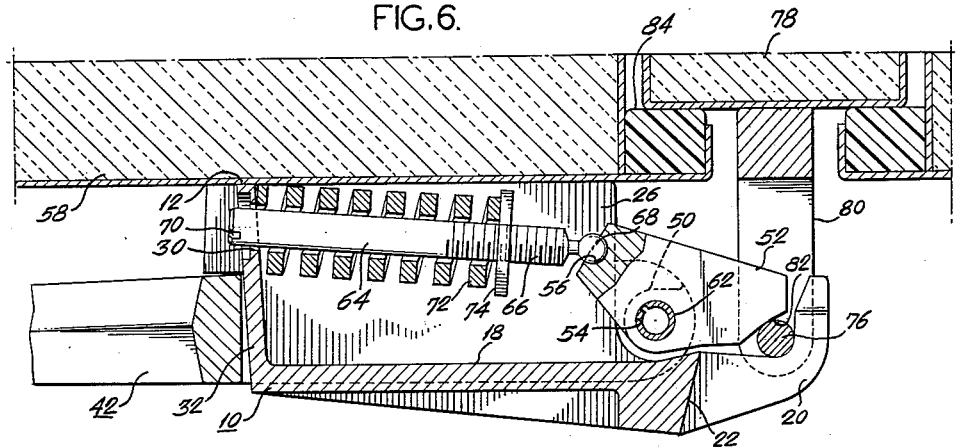
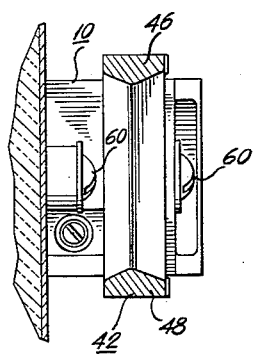
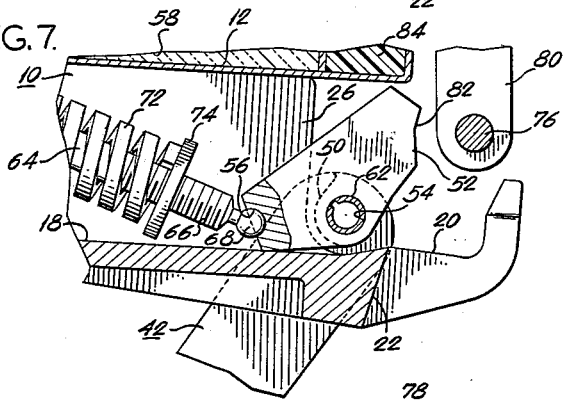
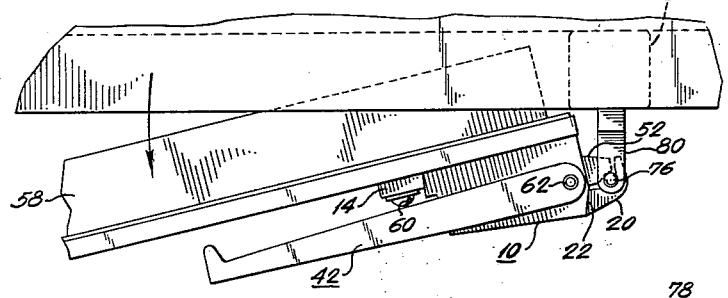
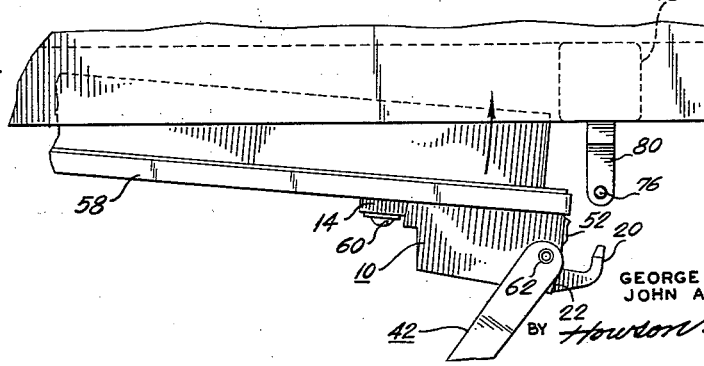
INVENTORS:
GEORGE DONALD FLAITH
JOHN A. WESTENBERGER
BY Howson & Howson
ATTYS.

Oct. 1, 1963  G. D. FLAITH ETAL  3,105,266
COMBINATION LATCH AND HINGE
Filed Jan. 5, 1961  5 Sheets-Sheet 5
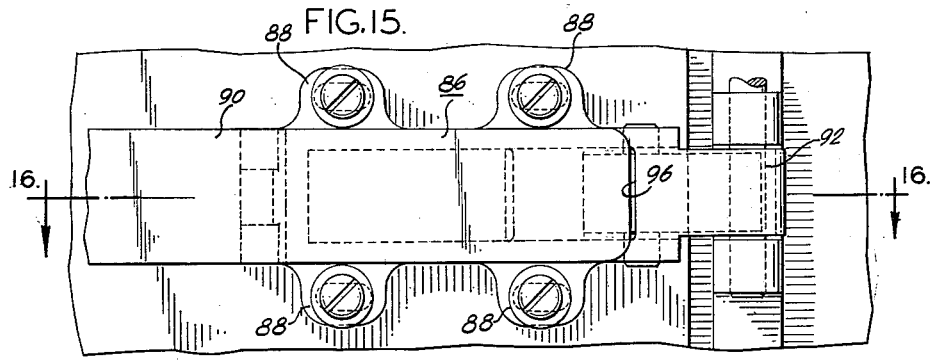
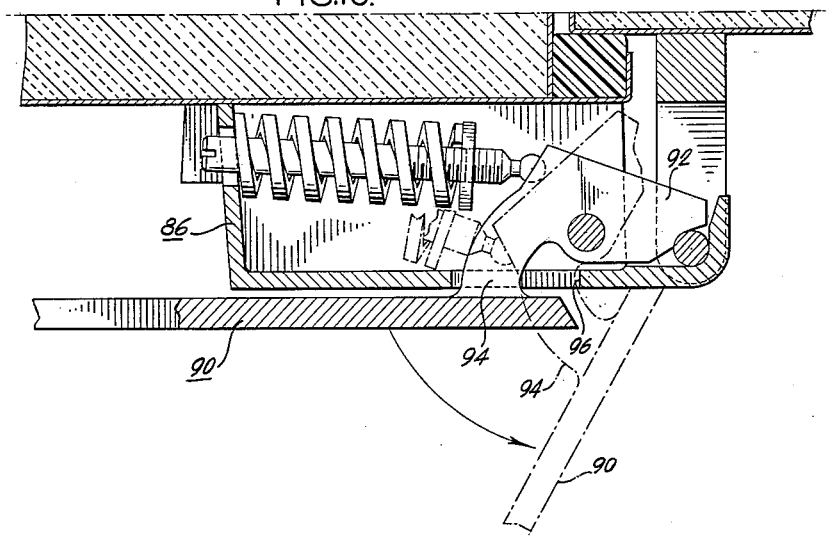
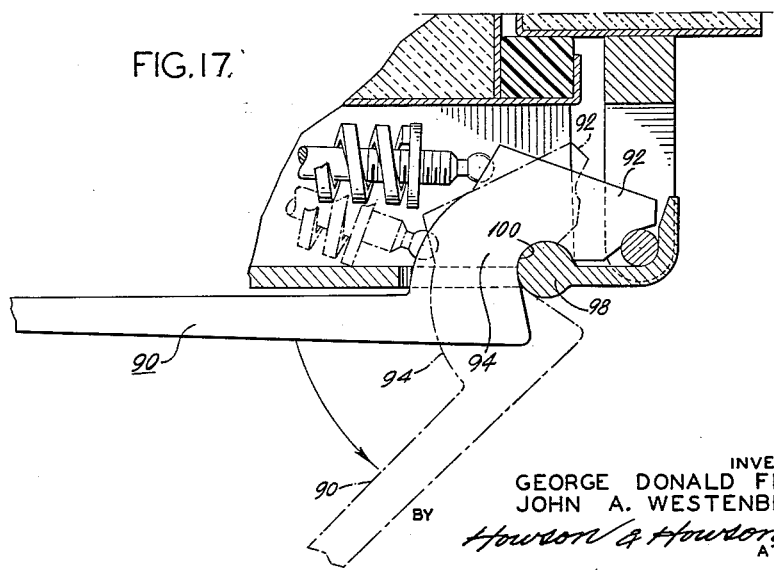
INVENTORS:
GEORGE DONALD FLAITH
JOHN A. WESTENBERGER
BY Howson & Howson
ATTYS.

United States Patent Office 3,105,266
Patented Oct. 1, 1963

3,105,266
COMBINATION LATCH AND HINGE
George Donald Flaith, Wyndmoor, and John A. Westenberger, Hatboro, Pa., assignors to Proctor & Schwartz, Inc., Philadelphia, Pa., a corporation of Pennsylvania
Filed Jan. 5, 1961, Ser. No. 80,932
4 Claims. (Cl. 16—147)

The present invention relates generally to fastenings for doors, removable covers, and the like, and more particularly to fastenings for equipment enclosure sealing panels which must be frequently opened or removed to provide access to enclosed apparatus.

Certain types of large industrial equipment, because of their nature, require sealed enclosures or casings. In conveyor driers, for example, the entire conveyor must be enclosed in a relatively air-tight manner to prevent loss of the hot drying gases. Since access to the inner areas of such equipment is generally necessary, rows of removable or hinged panels have in the past been utilized to form the side walls of such enclosures.

In conveyor driers, considerable difficulty has been encountered with respect to the fastenings for such panels, which ideally should provide both an air-tight seal pressure when in a closed securing position, and at the same time be of a construction which allows simple, fast opening and/or removal of the panels. Previous efforts to reach a solution have included use of strap hinges with dogs securing the unhinged panel edge. However, it was necessary to add dogs along the hinged edge to maintain a satisfactory seal. Often such door panels were opened without releasing the hinged edge dogs resulting in breakage thereof. Also, removal of the panels was difficult and time-consuming. Additionally, the direction in which the hinged panel opened had to be specified for each installation to fit the space available.

These and other difficulties have been overcome by the present invention, one object of which is to provide a combination hinge and latch, application of which along opposite panel edges permits opening of the panel by selective pivoting on either such edge.

An additional object of the invention is to provide a combination hinge and latch of the type described which, when in the open position, will permit complete removal of a panel member.

Another object of the invention is to provide a combination hinge and latch of the lever-actuated type to permit simple, positive manipulation of the fastening member.

A still further object of the invention, as described, is to provide panel fastenings which, although located on the exterior of the enclosing panels, may nevertheless be opened from the interior, either by the blows of a trapped worker or by the force of an explosion within the enclosed apparatus.

Another object is to provide fastenings which, when securing a panel in the closed position by means of an adjustable spring pressure, will bias the panel in sealing relationship against the panel receiving frame.

Still another object of the invention is to provide a fastening as described which is designed to be exteriorly mounted, and is therefore suitable for use on panels of any thickness.

A further object of the invention as described is to provide fastenings which when used on adjoining panel members coact and interfit so as to simplify the mounting structure as well as provide a coordinated appearance.

The present invention, in realizing these and other objects includes a housing member which is attached to an edge of the panel, which is to be secured. Extending from an end of the housing member is an L-shaped hinge finger. A hinge lug having an actuating lever extending therefrom is pivotally mounted to the housing member. Mounted inside of the spring housing member is a spring in compression bearing against the hinge cam. A hinge pin is mounted on the panel supporting structure adjacent the edge of the panel on which is mounted the above described latch and hinge assembly.

In operation, the actuating lever is moved out from the panel surface, and the spring force is so directed to maintain the open position of the lever. This pivots the hinge lug into an open position with respect to the L-shaped hinge finger so that the hinge lug and hinge finger may enclose the stationary hinge pin when the panel is closed against the panel supporting structure. The actuating lever is then pivoted to its closed position parallel to the panel surface which, due to an over-center effect, changes the direction of the spring force to press the hinge lug against the hinge pin, at the same time exerting a constant sealing force against the panel biasing it against the panel supporting frame. In this closed position of the actuating lever, the fastening may be used as a hinge. When pairs of such fastenings are used on opposing edges of a panel or a door, the panel may be opened pivotally from either side or entirely removed.

Additional objects and advantages of the invention will be more readily apparent from the following detailed discussion of embodiments thereof when taken together with the accompanying drawings in which:

FIG. 3 is a plan view, partly in section, of a fastening secured to a panel and in a closed position securing the panel to a panel supporting member by means of a hinge pin;

FIG. 4 is a front elevational view of a fastening mounted as in FIG. 3;

FIG. 5 is a rear elevational view of the mounted fastening taken along line 5—5 of FIG. 3;

FIG. 6 is a sectional view of a mounted panel securing fastening taken along line 6—6 of FIG. 4;

FIG. 7 is a fragmentary view of a portion of FIG. 6 showing the position of the spring actuated members of the fastening in an open position;

FIG. 8 is a view taken along line 8—8 of FIG. 4;

FIG. 9 is a plan view of a fastening mounted on a panel and in a closed position being utilized as a hinge to rotate the panel with respect to a secured hinge pin;

FIG. 10 is a plan view of a fastening mounted to a panel edge and utilized as a latch, the fastening in an open position shown as ready to receive a hinge pin to secure the panel thereto;

FIG. 15 is an elevational view of a further modified embodiment of the invention;

FIG. 16 is a sectional view taken along line 16—16 of FIG. 15, showing the modified latching mechanism of that embodiment; and FIG. 17 is a sectional view showing the latching mechanism of another modified embodiment.

Figure 1:
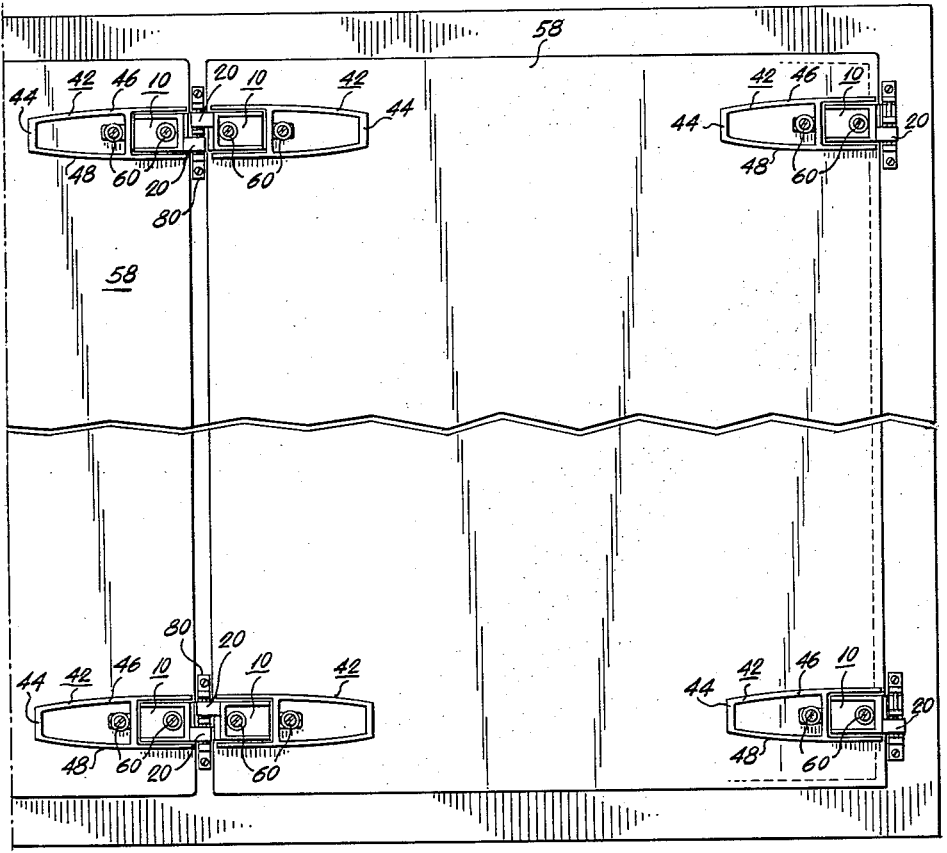
FIG. 1 is an elevational view of an embodiment of the invention showing use of the embodiment in pairs along two adjoining panel edges and the manner in which they intercoact in such an adjoining mounting.

Referring to the drawings, FIG. 1 shows an embodiment of the invention mounted in pairs along adjoining panel edges. The specific structure of this embodiment is more readily understood by reference to FIG. 11 which is an exploded view of two principal components of the invention. The spring housing member 10 is of a generally rectangular box-like shape and, on installation, is secured to the exterior face of a panel, the open side 12 of the spring housing 10 abutting the panel face. Securing means include a mounting lug 14 extending from an end of the housing 10 and adapted to receive a bolt or screw, and a hole 16 for a bolt or screw through the exterior face 18 of the housing 10. An L-shaped hinge finger 20 extends from the face 18 beyond the end 22 of the housing 10. A hinge lug guide wall 24 extends inwardly from the housing end 22 parallel with the housing lower edge 26. A slot 28 in the wall 24 permits the use of fastenings with the hole 16. A spring rod positioning hole 30 is located in the housing end wall 32 below the mounting lug 14. The housing end 32 includes an outwardly extending off-set portion 34 in the area of the mounting lug. The housing end 22 terminates at its juncture with the hinge lug guide wall 24 to form an edge 36, thus forming an open slot into the spring housing 10 opposite the L-shaped hinge lug. An actuating lever pivotal mounting pin hole 38 extends vertically through the spring housing upper end 40 and through the hinge lug guide wall 24 near the housing end 22.

Figure 11:
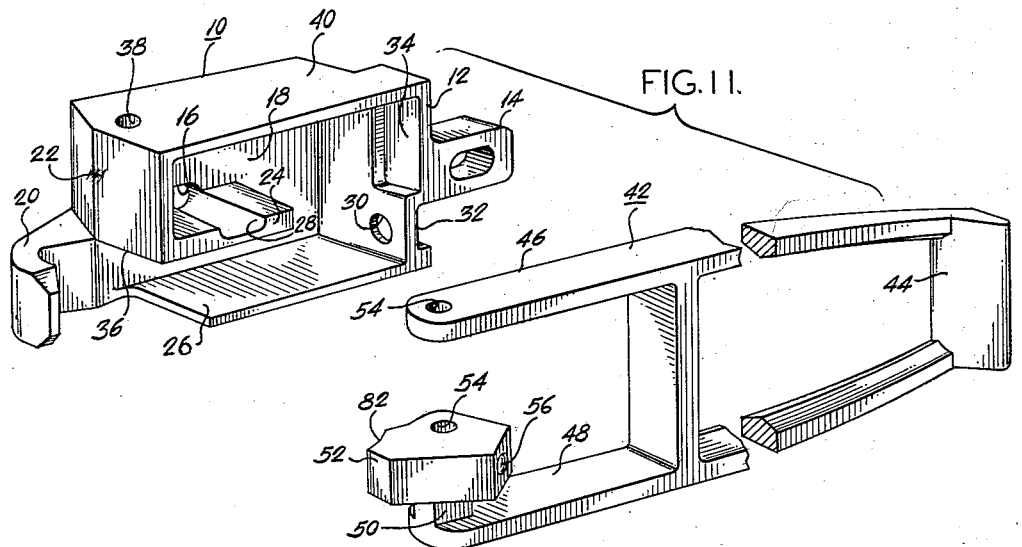
FIG. 11 is an exploded perspective view showing the shape of the spring housing member and the actuating lever of the fastening.

The outer component depicted in FIG. 11 is an A-shaped actuating lever of handle 42. At one end the actuating lever terminates in a gripping bar 44 to facilitate manipulation of the lever. The bifurcated end of the actuating lever includes upper and lower prong members 46 and 48. Mounted between the prong members and integrally connected to the lower prong member by a stud 50 is an irregularly shaped hinge lug 52. Vertical lever mounting pin holes 54 extend through the ends of the upper and lower prongs and also through the lower prong stud 50 and the hinge lug 52. The shape of the hinge lug 52 causes it to be substantially off-center with respect to the mounting pin hole. A spring rod guide is provided in one vertical face of the hinge lug in the form of a hemispherically shaped indentation 56.

FIGS. 3 and 4 show the manner in which the spring housing member 10 and the actuating lever 42 are assembled and mounted on a panel 58 by machine screws or bolts 60 passing through the mounting lug 14 and the hole 16 of the spring housing member 10. The actuating lever 42 is pivotally mounted on the spring housing 10 by means of a lever mounting pin 62 extending and positioned in the lever mounting pin holes 54 of the bifurcated end of the actuating lever and the mounting pin hole 38 of the spring housing 10. In this instance, the lever mounting pin is shown to be of the expandable split tubing type thereby eliminating the need for any pin securing devices, the expandable pin frictionally maintaining its position in the spring housing 10.

FIG. 6, a sectional plan view of an assembled and mounted combination latch and hinge, shows the mechanism applying a spring force to the hinge lug 52. This mechanism includes a spring rod 64 having a threaded end 66 terminating in a ball tip 68 which is seated in the hemispherically shaped indentation 56 of the hinge lug 52. A slotted end 70 of the spring rod 64 extends into the spring rod positioning hole 30 of the spring housing member 10. A coil spring 72 is mounted on the spring rod 64 and is held in compression against the housing end 32 by a spring bearing plate 74, which is threaded onto the end 66 of the spring rod. As shown most clearly in FIG. 5, the spring bearing plate 74 is of such size and shape that rotation thereof is prevented by its proximity to and contact with the hinge lug guide wall 24 and spring housing lower edge 26. Thus, rotation of the spring rod 64 will accordingly position the spring bearing plate 74 along the threaded end 66 of the spring rod, thereby changing the compression force exerted by the spring 72 on the spring bearing plate 74. The slotted end 70 of the spring rod extending through the housing end 32 permits such adjustment to be made with a screw driver while the invention is in a mounted position.

A hinge pin 76 is mounted outwardly from and parallel to a panel frame member 78 by a C-shaped hinge pin bracket 80. The hinge pin and bracket, and the spring housing member are so mounted respectively to the panel 58 and the panel frame member 78 that when the panel 58 is in the desired secured position with respect to the panel frame member 78, the hinge pin 76 will coact with the interior corner of the L-shaped hinge finger 20 of the spring housing member 10.

The shape of the hinge lug 52 is such that when the actuating lever 42 is in a closed position a curved edge 82 of the hinge lug is positioned opposite the interior corner of the L-shaped hinge finger 20. The space between the curved edge 82 and the hinge finger 20 is such as to accommodate the hinge pin 76.

In operation, the invention is mounted as described preferably in combinations of two or more along opposing panel edges as shown in FIG. 1. With the actuating lever in the open position as indicated in FIGS. 7 and 10, the compression spring force exerted on the spring bearing plate and thence through the spring rod is transferred by the spring rod ball tip to the hinge lug and tends to force the hinge lug end which contacts the ball tip in an outward direction thus tending to maintain the actuating lever in the open position. This outward force results due to the fact that the spring force is directed to the outside of the hinge lug pivotal point which is the lever mounting pin 62.

When functioning as a latch, the invention as shown in FIG. 10 is operated by pulling the actuating lever outward into an open position and swinging or placing the panel into its closed position with respect to the panel frame member. FIG. 7 shows the position of the hinge finger 20 and the pivoted hinge lug 52 with respect to the hinge pin 76 as the panel approaches the closed position. When the panel 58 has reached its closed position against the panel frame members 78, the actuating lever 42 is swung into a closed position thereby pivoting the hinge lug and the curved edge 82 into contact with the hinge pin 76. This pivoting of the hinge lug 52 changes the direction of the spring force exerted on the hinge lug by the spring rod. When the actuating lever 42 is in a closed position, the spring force is exerted on the hinge lug on the inward side of the hinge lug pivotal mounting point and thus forces the surface 82 of the hinge lug 52 against the hinge pin 76. The hinge pin being permanently anchored to the panel frame member 78 by means of the hinge pin bracket 80, the actual result of this spring force acting through the hinge lug 52 is to force the lever mounting pin inward which, in turn, bears against the spring housing member 10 forcing the panel sealing lip 84 into sealing contact with the panel frame member 78.

The sealing force provided by the invention when in the closed position can be adjusted by rotating the spring rod 64 by means of the slotted end 70 which, as indicated in FIG. 8, is readily accessible from the lever end of the spring housing. When rotated, the spring rod turns on its ball tip 68 while the spring bearing plate 74 is prevented from rotating by the hinge lug guide wall 24 and the spring housing lower edge 26, as may be seen in FIG. 5. The rotation of the spring rod with respect to the spring bearing plate causes the spring bearing plate to move axially along the spring rod in a direction determined by the direction of rotation of the spring rod. The change in position of the spring bearing plate on the spring rod changes the length of the coil spring 72 resulting in a corresponding change in the pressure produced by the spring on the spring bearing plate 74. Thus, the sealing pressure exerted on the panel may be adjusted by merely rotating the spring rod. The sealing pressure is, of course, initially regulated by including a spring having the desired compression characteristics at the time the panel fastening is mounted.

The use of the invention as a latch has been described above. In the closed position, it may also function as a hinge by maintaining the actuating lever in a closed position. FIG. 9 clearly illustrates such use as a hinge, during which the curved edge 82 of the hinge lug 52, by means of the spring pressure, keeps the hinge pin 76 positioned in the corner of the L-shaped hinge finger 20. The hinge pin cannot escape due to the spring pressure forcing the hinge lug against it. When the door is swung shut, the spring sealing pressure is again resumed.

Figure 2:
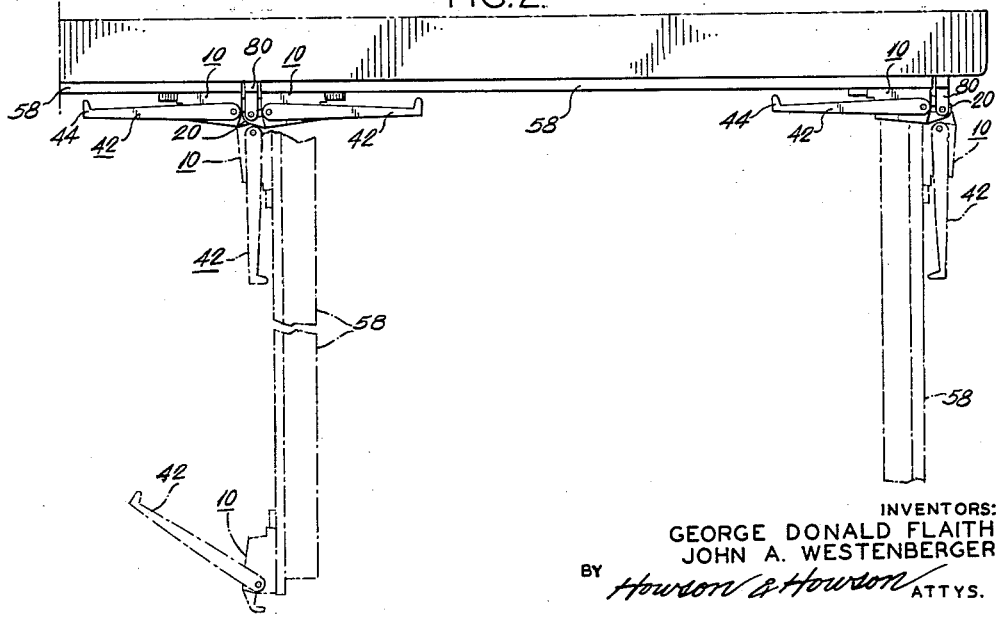
FIG. 2 is a plan view of the arrangement shown in FIG. 1 which includes, in broken lines, an indication of the manner in which a panel may be swung open by pivoting on either fastened edge.

The use of pairs of this combination latch and hinge on panel edges as shown in FIG. 1 permits simple removal of the entire panel from the panel frame assembly by pulling each actuating lever into the open position and removing the panel from the frame. Or as shown in FIG. 2, use of opposed pairs of the invention allows hinged pivoting of a panel along either edge thereof to suit space limitations of the installation or for convenience in reaching the interior of the housing. FIG. 2 shows, in broken lines, a panel swung both to the left and to the right indicating that the panel may be swung in either direction with equal ease. Of course, this same panel may, as mentioned above, be entirely removed from the panel frame merely by opening all of the actuating levers and lifting the panel clear of the frame. As is seen in FIGS. 2, 3, 6, 7, and 10, the operation of the actuating lever is an uncomplicated, positive action because of the over-center effect produced by the spring loaded spring rod. This effect, as above described, channels the spring force to assist in maintaining either a fully closed actuating lever position or a fully open actuating lever position. Thus, the mechanism functions in a crisp, non-hesitating manner thereby providing the simple, positive manipulation of the fastening member.

It is sometimes necessary or desirable when installing panel sections of the type described, having exteriorly mounted fastenings, to provide some means for permitting opening of the panels from within the enclosed area. In some installations in which there is a danger of explosion within the enclosure, it is desirable to include panels or doors which will blow out from the force of an explosion thereby relieving the enclosed apparatus from damage caused by a high interior chamber pressure during such an explosion. The chance that a worker might inadvertently be trapped within the enclosure also is a good reason for providing such panels with interior release mechanisms. The present invention, although mounted solely on the exterior of the panel and panel frame members, nevertheless permits opening of a fastened panel from within merely by applying sufficient force against the inside surface of the panel. The amount of force needed to open such a panel from within depends directly on the spring pressure exerted on hinge lug 52 of the fastening units securing the panel. Referring to FIG. 6, it will be noted that a force acting outwardly against the panel 58 would be transmitted through the lever mounting pin 62 to the hinge lug 52 which in normal closed position is biased against the hinge pin 76 by the force of the spring 72. The outwardly directed force on the panel 58 causes the hinge lug 52 to pivot about the lever mounting pin 62 because of the fixed hinge pin 76. Pivoting of the hinge lug 52 causes the spring rod 64 to cross the center line between the spring rod positioning hole 30 and the lever mounting pin 62 thereby directing the effect of spring force against the hinge lug 52 in the direction to open the hinge lug and the actuating lever to the position shown in FIG. 7. Thus, it can be seen that a weak spring force will permit an opening of the latch by a weak force from within the enclosure while a strong spring will correspondingly require a strong interior force to open the panel. When the invention is used employing spring forces adequate to seal the panels against the panel frame members, the panels may be easily knocked out from within by a person of average strength, and, of course, would also blow out in the event of an explosion.

The fact that the invention is mounted entirely on the exterior surface of a panel and panel frame member, permits use of the invention with panels of any thickness. Different panel sealing lip thicknesses would require hinge pin brackets of suitably different sizes. However, the major unit of the invention could be used interchangeably. This is an advantage from the standpoint of either ordering replacements or of carrying an inventory of replacements in the stock.

It will be noted from FIG. 1, which shows pairs of an embodiment of the invention used along adjoining panel edges, that such adjacent latches interfit by sharing the same hinge pin and bracket. FIG. 4 shows such a double duty bracket engaged by a single latch. The reason for off-setting the hinge finger 20 toward the lower edge of the spring housing member 10 in each embodiment can now be appreciated again by reference to FIG. 1. It is seen in this figure that the same embodiment of the latch is used along the right-hand or the left-hand edge of the panel and that such use results in the efficient interfitting relation described.

For certain types of installations it is better not to use the preferred embodiment to fasten adjoining panels by means of a common hinge pin bracket. As shown in FIG. 2, only one of two adjoining panels may be opened to any substantial degree by pivoting on the common hinge pin bracket at one time, and a panel may not be pivotally opened through more than 90° unless the adjoining panel latch has been disengaged from the common hinge pin bracket. This is due to the interference by the spring housing 10 of the secured panel with the pivoting hinge finger 20 of the panel being opened.

Figure 12:
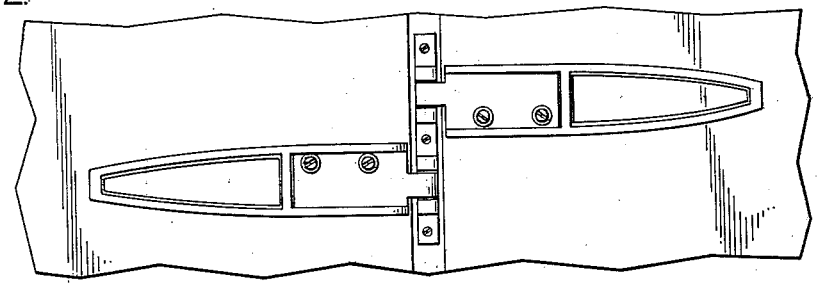
FIGS. 12 and 13 are modified embodiments of the invention shown in elevational view on adjoining panel edges.
Figure 13:
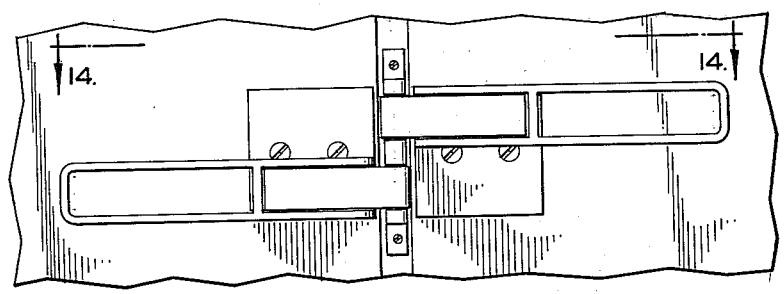
Figure 14:
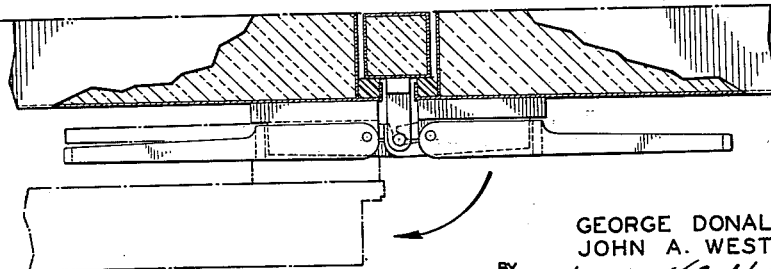
FIG. 14 is a plan view, partly in section, showing the modified embodiment of the invention of FIG. 13, taken on line 14—14, thereof, mounted on adjoining panels and indicating the position of one of such adjoining panels when fully opened.

This disadvantage is overcome by each of the modified embodiments of the invention shown in FIG. 12 and FIG. 13. In these embodiments, the individual latch members are off-set with respect to the corresponding member on the adjoining panel although still retaining common hinge pin brackets. This permits both adjoining doors to be swung on the same pivotal mounting to an opening position of at least 90°. It also permits, as shown in FIG. 14, one of two adjoining panel members to be pivotally opened a substantially full 180° in spite of the closed latch of the other adjoining panel on the common hinge pin bracket. Thus on installations where it is important that panels be swung open on a common bracket, or that panels be opened a full 180° against a closed adjoining panel, these modified embodiments can be employed.

A further modified embodiment is shown in FIGS. 15 and 16. This embodiment includes the improved operating characteristics of the embodiments shown in FIGS. 12, 13, and 14. The spring housing 86 of this embodiment is of a narrow shape with securing flanges 88 extending therefrom. The principal structural distinction over other embodiments appears in the manner in which the actuating lever 90 is connected with the hinge lug 92 by means of a neck portion 94 which passes through an opening 96 in the spring housing 86 front face. This construction is appreciably simpler than previously described embodiments, it being no longer necessary to provide a bifurcated actuating lever of the type described in previous embodiments. The operation of this embodiment is identical with that of the preferred embodiment described above.

FIG. 17 shows a portion of a still further embodiment, which uses a hinge lug and actuating lever construction similar to that shown in FIGS. 15 and 16 but distinctive in the manner in which the hinge lug 92 and actuating lever 90 are pivoted with respect to the spring housing. A cylindrical shoulder 98 serves as a pivotal surface for the actuating lever-hinge lug member bearing against the contoured edge 100 of the neck portion 94. The force of the spring holds this member in place against the shoulder 98. This mechanism, as indicated on the drawing, functions in substantially the same manner as the embodiments described heretofore.

Manifestly minor changes in details of construction can be effected by those skilled in the art without departing from the spirit and scope of the invention as defined in and limited solely by the appended claims.

We claim:

1. A combination latch and hinge for latching or hinging a panel to a panel supporting frame comprising a hinge pin mounted on the panel supporting frame, a housing attached to an edge of the panel, a hinge finger projecting from said housing, said hinge finger having an L-shaped configuration, said hinge finger being adapted to overlie said hinge pin upon closure of the panel against said frame with the outer leg of the L being directed towards said frame and adapted to engage said hinge pin upon closure of the panel against the frame, a hinge lug pivotally mounted on said housing proximate said hinge finger, means for selectively positioning said hinge lug in a closed or open position, spring means operatively engaging said hinge lug when said hinge lug is in the closed position to bias said hinge lug against said hinge pin so as to effect a gripping action on said hinge pin in conjunction with said hinge finger, said hinge lug in the closed position acting upon said hinge pin to urge said hinge pin along the outer leg of the L of said L-shaped finger toward the inner leg thereof, said hinge lug in the closed position permitting the pivoting of the panel about said hinge pin and providing a resilient seating of the panel edge against said panel supporting frame, said hinge lug in the open position being spaced from said hinge finger permitting withdrawal of said hinge lug and hinge finger from said hinge pin thereby permitting removal of the panel edge from the panel supporting member.

2. A combination latch and hinge as claimed in claim 1, said spring means engaging said pivotally mounted hinge lug such that pivoting said hinge lug toward an open position transfers the direction of spring force across the pivot point of said hinge lug thereby redirecting the spring force to effect and maintain an open position of the hinge lug.

3. A combination latch and hinge as claimed in claim 1, said hinge lug when in the closed position engaging said hinge pin upon the panel supporting frame side of said hinge pin thereby urging said hinge pin outwardly along said hinge finger to effect a resilient sealing of the panel edge.

4. A combination latch and hinge as claimed in claim 1, said means for selectively positioning said hinge lug including an actuating lever connected to said hinge lug for movement thereof.

References Cited in the file of this patent

UNITED STATES PATENTS

| | | |
|---|---|---|
| 1,272,594 | Wolter | July 16, 1918 |
| 2,620,889 | McCormick | Dec. 9, 1952 |
| 2,745,132 | Clark et al. | May 15, 1956 |
| 3,025,094 | Buchanan | Mar. 13, 1962 |
| 3,048,898 | Davis | Aug. 14, 1962 |

FOREIGN PATENTS

| | | |
|---|---|---|
| 509,197 | Canada | Jan. 18, 1955 |